(12) United States Patent
Bulusu et al.

(10) Patent No.: US 7,188,238 B2
(45) Date of Patent: Mar. 6, 2007

(54) METHODS AND APPARATUS TO UPDATE A BASIC INPUT/OUTPUT SYSTEM (BIOS)

(75) Inventors: Mallik Bulusu, Olympia, WA (US); Vincent Zimmer, Federal Way, WA (US); Sandip Hiray, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 10/442,486

(22) Filed: May 21, 2003

(65) Prior Publication Data

US 2004/0236936 A1    Nov. 25, 2004

(51) Int. Cl.
*G06F 15/177* (2006.01)
*G06F 9/455* (2006.01)

(52) U.S. Cl. ............................... 713/2; 713/1; 713/100
(58) Field of Classification Search ............... 713/1, 713/2, 100
See application file for complete search history.

(56) References Cited

U.S. PATENT DOCUMENTS

| | | | | |
|---|---|---|---|---|
| 5,579,522 A | * | 11/1996 | Christeson et al. ............ | 713/2 |
| 6,122,733 A | * | 9/2000 | Christeson et al. ............ | 713/2 |
| 6,182,188 B1 | * | 1/2001 | Hasbun et al. ............... | 711/103 |
| 6,205,548 B1 | * | 3/2001 | Hasbun ......................... | 713/2 |
| 6,282,647 B1 | * | 8/2001 | Leung et al. ................ | 713/100 |
| 6,438,688 B1 | * | 8/2002 | Nunn ............................. | 713/2 |
| 6,594,757 B1 | * | 7/2003 | Martinez ....................... | 713/2 |
| 6,629,192 B1 | * | 9/2003 | Schaefer et al. ............. | 711/103 |
| 6,934,881 B2 | * | 8/2005 | Gold et al. .................... | 714/15 |
| 2003/0177345 A1 | * | 9/2003 | Huang ............................. | 713/2 |
| 2004/0024917 A1 | * | 2/2004 | Kennedy et al. ............... | 710/1 |
| 2004/0193865 A1 | * | 9/2004 | Nguyen et al. ................. | 713/2 |
| 2004/0205779 A1 | * | 10/2004 | Almeida et al. ............ | 719/321 |
| 2004/0225873 A1 | * | 11/2004 | Diaz ............................. | 713/1 |

OTHER PUBLICATIONS

Extensible Firmware Interface Specification, Intel Corporation, Dec. 1, 2002.

* cited by examiner

*Primary Examiner*—Rehana Perveen
*Assistant Examiner*—Nitin C. Patel
(74) *Attorney, Agent, or Firm*—Hanley, Flight & Zimmerman, LLC

(57) ABSTRACT

Methods and apparatus to update a basic input/output system (BIOS) are described herein. In an example method, a processor determines a storing characteristic associated with a BIOS component stored in a non-volatile memory, and determines an operating characteristic associated with the BIOS component. Based on the storing characteristic and the operating characteristic associated with the BIOS component, the processor determines boundaries of the BIOS component within the non-volatile memory.

27 Claims, 8 Drawing Sheets

| BIOS Components | Partition | Type | Size | Begin Address/ Begin Offset | End Address/ End Offset |
|---|---|---|---|---|---|
| Boot Block | Primary | Non-shared | 64 kB | 4 GB - 64 kB | 4 GB |
| System BIOS | Primary | Non-shared | 512 kB | 4 GB - 576 kB | 4 GB - 64 kB |
| EFI Boot Manager | Primary | Non-shared | 32 kB | 4 GB - 608 kB | 4 GB - 576 kB |
| EFI Boot Maintenance | Primary | Non-shared | 32 kB | 4 GB - 640 kB | 4 GB - 608 kB |
| EFI NVRAM | Left | Shared | 128 kB | 1024 kB | 1152 kB |
| EFI Core | Left | Shared | 768 kB | 1152 kB | 1920 kB |
| System Error Log | Right | Shared | 128 kB | 1024 kB | 1152 kB |
| System Defaults | Right | Shared | 40 kB | 1152 kB | 1192 kB |
| User Logo | Right | Shared | 128 kB | 1216 kB | 1344 kB |
| User Binary | Right | Shared | 128 kB | 1344 kB | 1472 kB |
| Boot Block | Secondary | Non-shared | 64kB | 4 GB - 2 MB - 64 kB | 4 GB - 2 MB |
| System BIOS | Secondary | Non-shared | 512 kB | 4 GB - 2 MB - 576 kB | 4 GB - 2 MB - 64 kB |
| EFI Boot Manager | Secondary | Non-shared | 32 kB | 4 GB - 2 MB - 608 kB | 4 GB - 2 MB - 576 kB |
| EFI Boot Maintenance | Secondary | Non-shared | 32 kB | 4 GB - 2 MB - 640 kB | 4 GB - 2 MB - 608 kB |

METHODS AND APPARATUS TO UPDATE A BASIC INPUT/OUTPUT SYSTEM (BIOS)

TECHNICAL FIELD

The present disclosure relates generally to firmware, and more particularly, to methods and apparatus to update a basic input/output system (BIOS).

BACKGROUND

In general, the basic input/output system (BIOS) of a processor system is implemented as software or firmware in the form of machine readable instructions that are stored in a non-volatile memory coupled to a processor. Following a reset operation or the application of power to the processor, the processor executes the BIOS instructions. Typically, the BIOS performs one or more hardware and software configuration and test activities prior to booting the operating system. The configuration activities carried out by the BIOS are responsible for establishing the manner in which hardware devices (e.g., disk drives, video controllers, keyboard, mouse, etc.) associated with the processor system interact with the operating system executed by the processor system. The test activities collect system configuration information that may be later used, for example, by the operating system to determine that hardware or devices associated with the system are ready for use and to facilitate debugging activities, configuration management activities, etc.

Typically, control code of the BIOS is stored in flash memory or flash random access memory (RAM). Flash memory is a type of non-volatile memory that is erased and reprogrammed in units of blocks. When the BIOS needs to be changed (i.e., rewritten), the flash memory may be written to in block sizes rather than byte. As a result, the flash memory is faster to update than an electrically erasable programmable read-only memory (EEPROM) that is erased and reprogrammed in bytes.

To store a backup of the BIOS components (e.g., code areas and data areas), the flash memory may be partitioned into a primary partition and a secondary partition. The secondary partition may be updated with an exact replica of BIOS components stored in the primary partition so that the content of the primary partition is reflected in the secondary partition (i.e., mirroring). However, some BIOS components may not change and therefore, may not need to be updated. Because not all BIOS components need to be mirrored (i.e., duplicated), the flash memory may be inefficiently used.

BRIEF DESCRIPTION OF THE DRAWINGS

FIG. 6 is an example BIOS component table.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
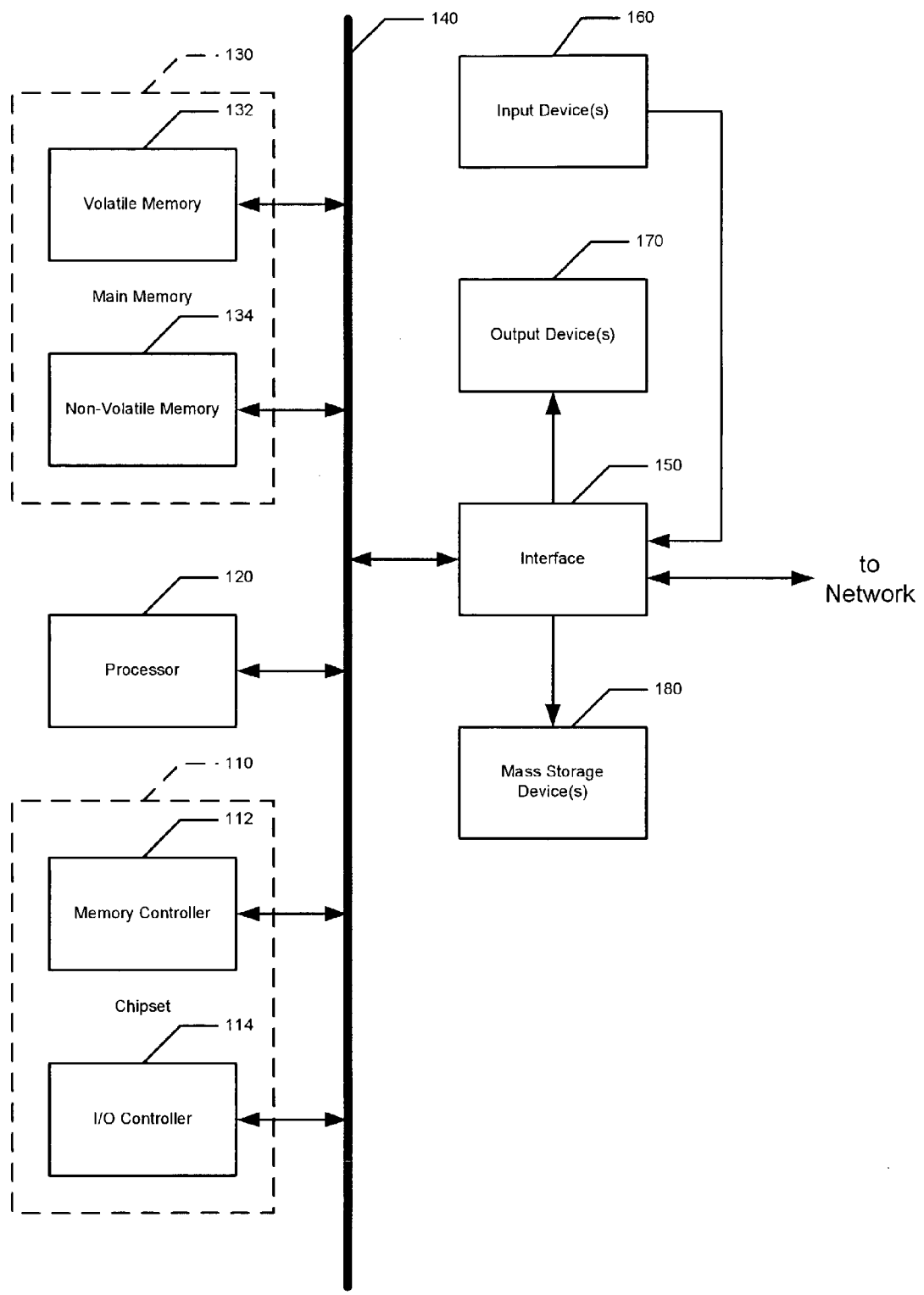
FIG. 1 is a block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance or any other type of computing device.

The processor system 100 illustrated in FIG. 1 includes a chipset 110, which includes a memory controller 112 and an input/output (I/O) controller 114. As is well known, a chipset typically provides memory and I/O management functions, as well as a plurality of general purpose and/or special purpose registers, timers, etc. that are accessible or used by a processor 120. The processor 120 is implemented using one or more in-order processors. For example, the processor 120 may be implemented using one or more of the Intel® Pentium® family of microprocessors, the Intel® Itanium® family of microprocessors, Intel® Centrino® family of microprocessors, and/or the Intel XScale® family of processors. In the alternative, other processors or families of processors may be used to implement the processor 120.

As is conventional, the memory controller 112 performs functions that enable the processor 120 to access and communicate with a main memory 130 including a volatile memory 132 and a non-volatile memory 134 via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented using flash memory, Read Only Memory (ROM), Electrically Erasable Programmable Read Only Memory (EEPROM), and/or any other desired type of memory device.

The processor system 100 also includes a conventional interface circuit 150 that is coupled to the bus 140. The interface circuit 150 may be implemented using any type of well known interface standard such as an Ethernet interface, a universal serial bus (USB), a third generation input/output interface (3 GIO) interface, and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes, among other things, a graphics driver card.

The processor system 100 also includes one or more mass storage devices 180 configured to store software and data. Examples of such mass storage device(s) 180 include floppy disks and drives, hard disk drives, compact disks and drives, and digital versatile disks (DVD) and drives.

The interface circuit 150 also includes a communication device such as a modem or a network interface card to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180 and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
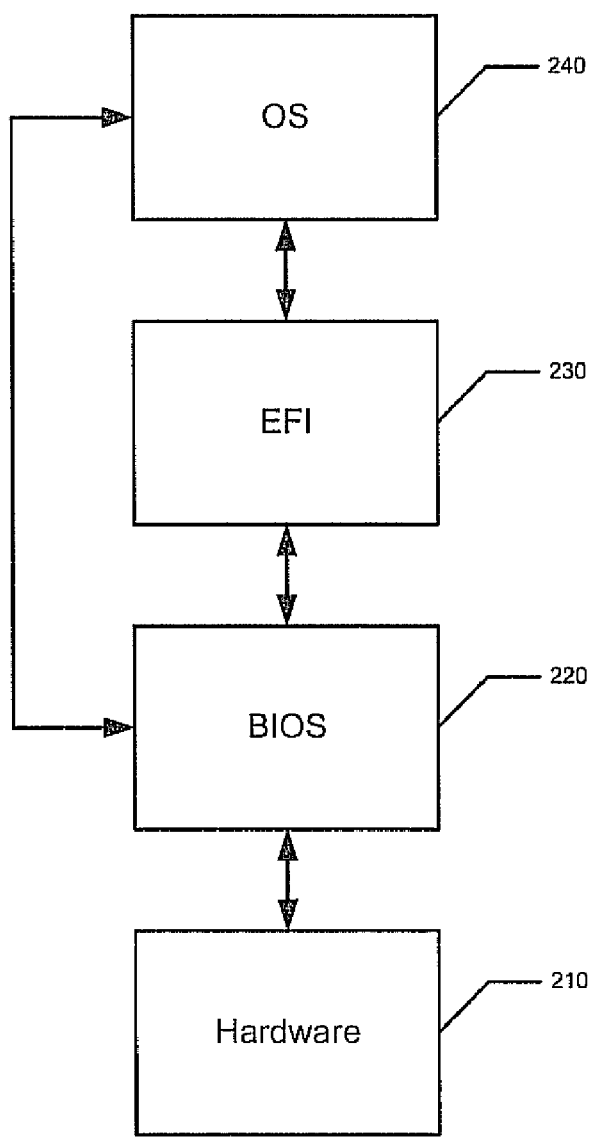
FIG. 2 is a block diagram representation of an example architectural hierarchy of the example processor system shown in FIG. 1.

In the example of FIG. 2, the illustrated architectural hierarchy 200 of the processor system 100 includes hardware 210, a BIOS 220, an extensible firmware interface (EFI) 230, and an operating system (OS) 240. Persons of ordinary skill in the art will readily recognize that hardware 210 may include any physical aspect of the processor system 100 such as the processor 120 and the main memory 130. Hardware 210 also includes the interface circuit 150, input device(s) 160, output devices 170, and/or the mass storage device 180. Basically, hardware 210 is any or all of the components shown in FIG. 1. The BIOS 220 may be implemented as software, firmware or machine readable instructions configured to boot up (i.e., start up) the processor system 100 in a conventional manner. To boot the OS 240 (e.g., Windows® and/or Linux) and to run pre-boot applications, the BIOS 220 manages data flow between the hardware 210 of the processor system 100 via the EFI 230. Alternatively, the BIOS 220 may directly communicate with the OS 240 without the EFI 230 in a conventional manner.

Figure 3:
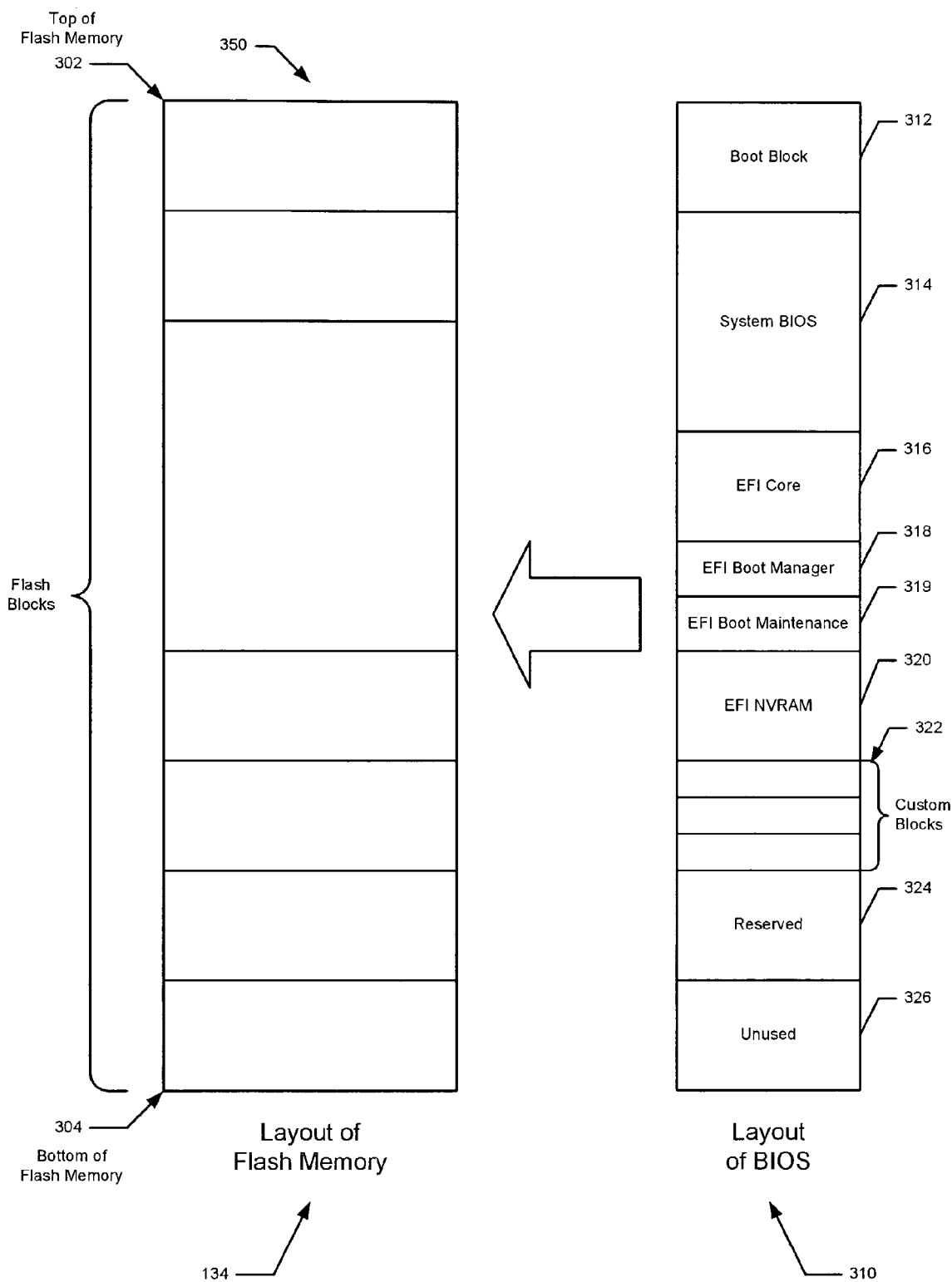
FIG. 3 is a block diagram representation of example layouts of a flash memory and of a BIOS.

After power-up, the processor 120 executes instructions of the BIOS 220 to boot up the processor system 100. In the example of FIG. 3, the illustrated BIOS 220 includes components 310 (i.e., the physical flash blocks) such as a boot block 312, a system BIOS block 314, an EFI core block 316, an EFI boot manager block 318, an EFI boot maintenance block 319, an EFI non-volatile random access memory (NVRAM) block 320, custom blocks 322 (e.g., virtual product data (VPD) blocks), a reserved block 324, and an unused block 326. While the BIOS 220 is depicted to include such code areas and/or data areas, the BIOS 220 may exclude one or more of the BIOS components 310 mentioned above and/or include one or more other code areas and/or data areas.

Although persons of ordinary skill in the art will readily appreciate the details of the various BIOS components 310 mentioned above, a brief description of each code area and/or data area is provided for convenience. The boot block 312 is a program loaded when the processor system 100 is turned on or reset to initiate the BIOS 220. The system BIOS block 314 facilitates memory initialization, peripheral component interconnect (PCI) enumeration, resource allocation, provision for set-up screens, and/or other boot operations. To assist the system BIOS block 314 in managing data flow, the EFI core block 316, the EFI boot manager block 318, the EFI boot maintenance block 319, and the EFI NVRAM block 320 are used to define an interface between the OS 240 and platform firmware. The EFI core block 316 consists of data tables containing platform-related information. The EFI core block 316 also includes boot and runtime service calls that are available to the OS 240 of the processor system 100. Accordingly, the EFI core block 316 provides a standard environment for booting the OS 240 and running pre-boot applications. Additional information pertinent to the EFI core block 316 the EFI boot manager block 318, the EFI boot maintenance block 319, and the EFI NVRAM block 320 are available at http://developer.intel.com/technology/efi. The custom blocks 322 are data areas to store information such as BIOS revision, system identification, manufacturer information, etc. For example, the custom blocks 322 may be include a user logo block so that a manufacturer may display its logo during a BIOS boot phase. In another example, the custom blocks 322 may be include a user binary block so that the manufacturer may display other data during the boot process. The reserved block 324 and the unused block 326 are designated for future growth of BIOS components 310.

The code areas and data areas of the BIOS 220 (i.e., the BIOS components 310 described above) may be stored in the non-volatile memory 134 (e.g., a flash memory). Flash memory is a type of non-volatile memory that is erased and reprogrammed in units of blocks. When the BIOS 220 needs to be changed (i.e., rewritten), the flash memory 134 may be written to in block sizes rather than byte. In particular, the layout of the flash memory 134 includes a top portion 302, a bottom portion 304, and a plurality of flash blocks 350. While flash memory 134 is shown to include the plurality of flash blocks 350 as an example, persons of ordinary skill in the art will readily recognize that the flash memory 134 is memory space without specific boundaries.

Figure 4:
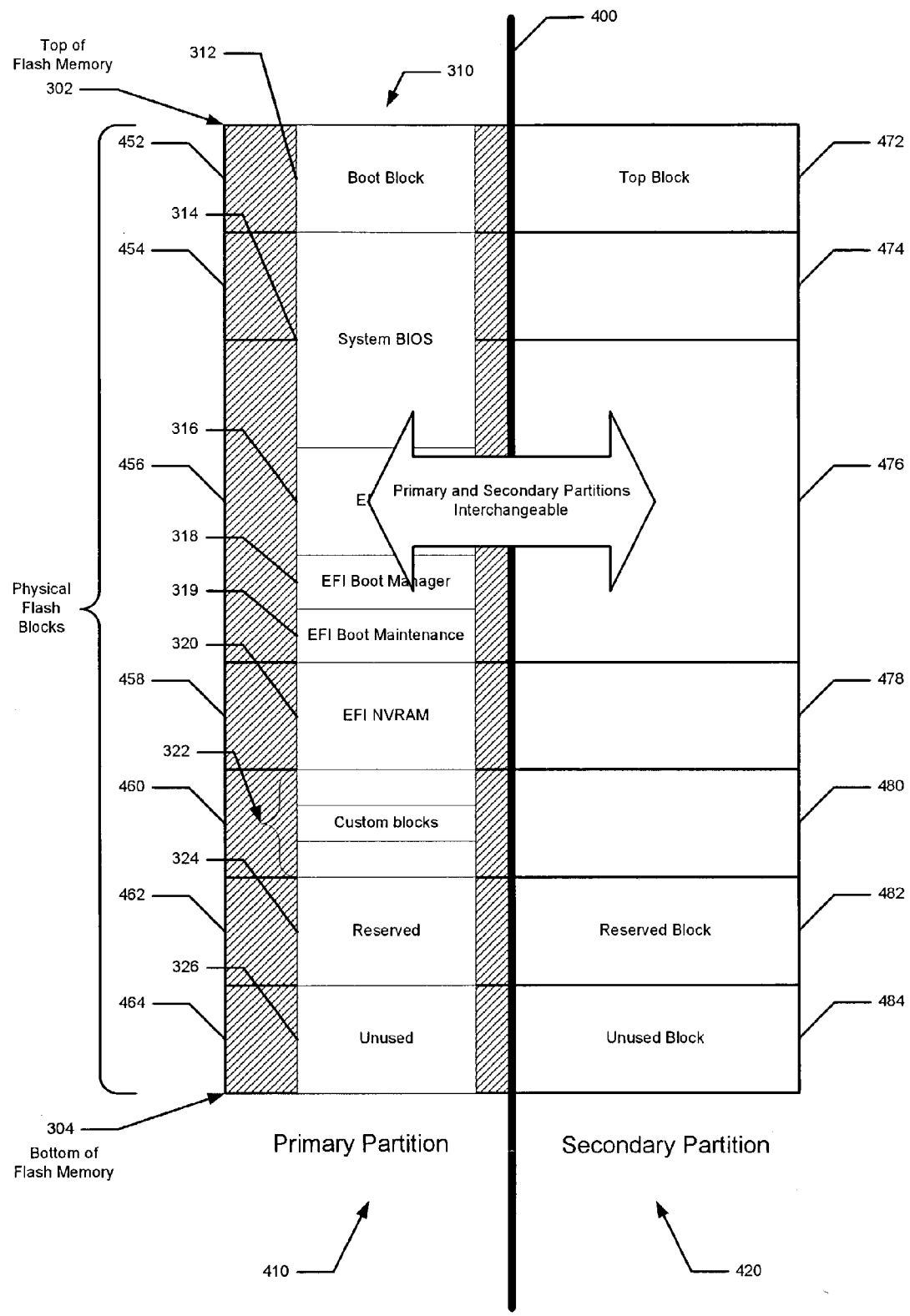
FIG. 4 is a block diagram representation of an example layout of the flash memory consumed by the BIOS.

Typically, the flash memory 134 is partitioned into two parts. In the example of FIG. 4, the flash memory 134 is partitioned by line 400 into a left partition 410 and a secondary partition 420. For example, the left partition 410 may be designated as the primary partition while the right partition 420 may be designated as the secondary partition. Accordingly, the processor 120 (e.g., a baseboard management controller (BMC) or a service processor) executes the BIOS components 310 stored in the left partition 410 for BIOS boots of the processor system 100. A duplicate copy of the BIOS components 310 is stored in the right partition 420 for BIOS updates from the OS 240. Alternatively, the left partition 410 may be designated as the secondary partition while the right partition 420 may be designated as the primary partition because the left and right partitions are interchangeable. With such versatility, the processor 120 may boot the processor system 100 using the BIOS components 310 stored on either the left partition 410 or the right partition 420 (i.e., the processor 120 may switch sides).

Figure 5:
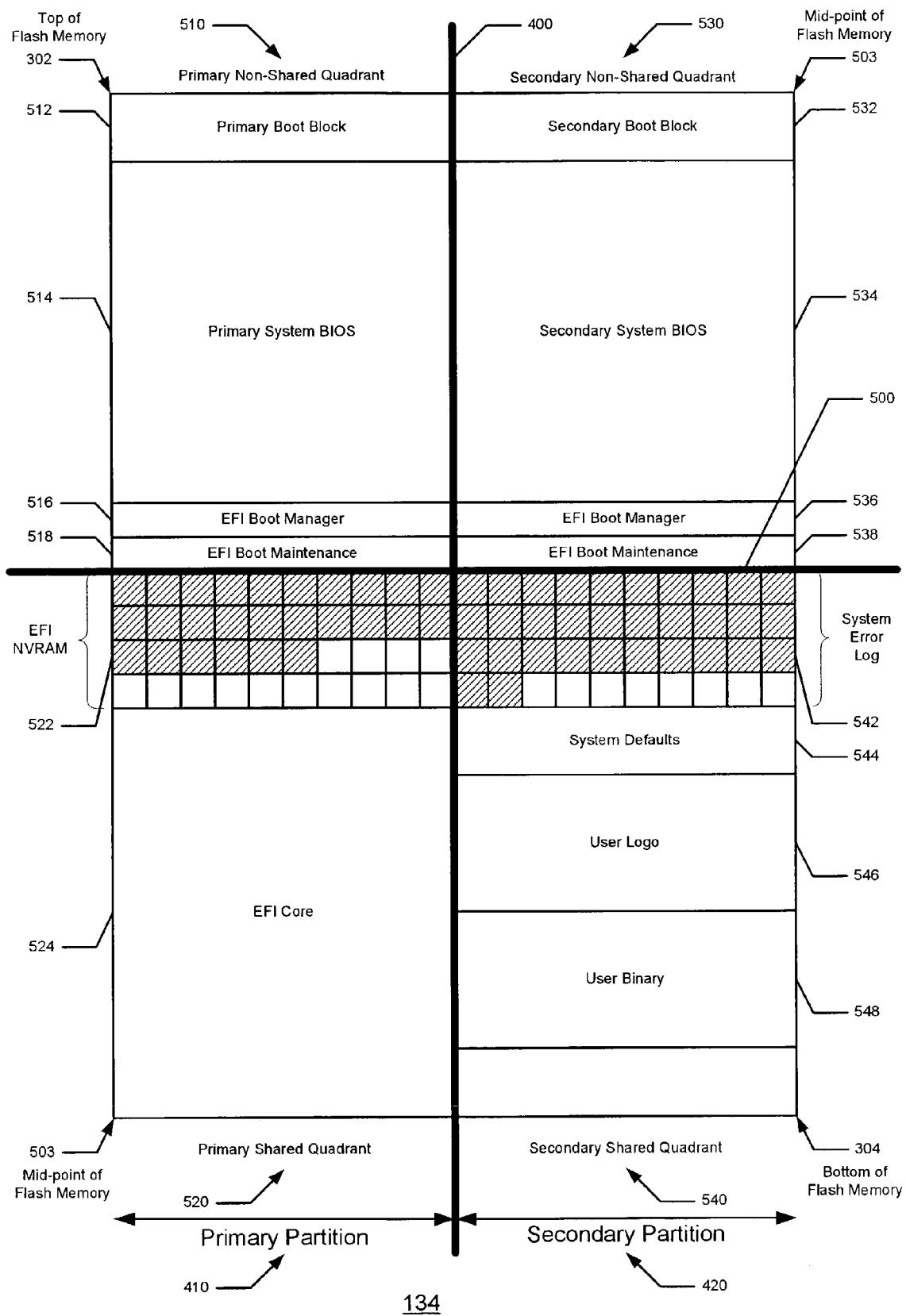
FIG. 5 is a block diagram representation of an alternate example layout of the flash memory consumed by the BIOS.

Because not all of the BIOS components 310 need to be duplicated, the memory space in the flash memory 134 may be wasted when the BIOS 220 is updated. As noted above, the flash memory 134 is partitioned vertically by line 400 into the left partition 410 (i.e., the primary partition) and the right partition 420 (i.e., the secondary partition). To conserve memory space, the flash memory 134 is further partitioned into quadrants. In the example of FIG. 5, the illustrated flash memory 134 is partitioned horizontally by line 500 into four quadrants: (1) primary non-shared quadrant 510, (2) primary shared quadrant 520, (3) secondary non-shared quadrant 530, and (4) secondary shared quadrant 540. In general, BIOS components 310 are stored in the quadrants 510, 520, 530, 540 such that some of the BIOS components 310 are shared between the partitions 410, 420. In particular, the primary non-shared quadrant 510 includes a primary boot block 512 and a primary system BIOS block 514. The primary shared quadrant 520 includes an EFI NVRAM block 522 and an EFI core block 524. The secondary non-shared quadrant 530 includes a secondary boot block 532 and a secondary system BIOS block 534. The secondary shared quadrant 540 includes a system error log block 542 and a system default block 544.

Some of the BIOS components 310 may vary (i.e., may be updated) by the BIOS 220 when the BIOS 220 is executed by the processor 120 to boot the processor system 100. That is, BIOS components, such as boot block 512, system BIOS 514, EFI boot manager 516, and EFI boot maintenance 518, may be not shared between the primary partition 410 and the secondary partition 420. For non-shared BIOS components, physical addresses (i.e., address of where a BIOS component is stored in the flash memory 134) may be used to locate and update those BIOS components. For example, assume that consumption of memory space by the BIOS components 310 begins at 4 gigabyte (GB) (i.e., top 302 of the flash memory 134) and occupies 4 megabytes (MB) of the flash memory 134 such that the bottom 304 of the flash memory 134 is at an address of 4 GB-4 MB and a mid-point 503 of the flash memory 134 is at an address of 4 GB-2 MB. In the example of FIG. 6, the illustrated BIOS table 600 indicates that the primary boot block 512 and the primary system BIOS block 514 occupy 64 kilobytes (kB) and 512 kB, respectively, of the flash memory 134. Because the primary boot block 512 and the primary system BIOS block 514 are non-shared BIOS components, the boundaries of the primary boot block 512 begin at an address of 4 GB-64 kB and end at an address of 4 GB (i.e., the top 302 of the flash memory 134), and the boundaries of the primary system BIOS block 514 begin at an address of 4 GB-576 kB and end at an address of 4 GB-64 kB (i.e., the begin address of the primary boot block 512).

Figure 7:
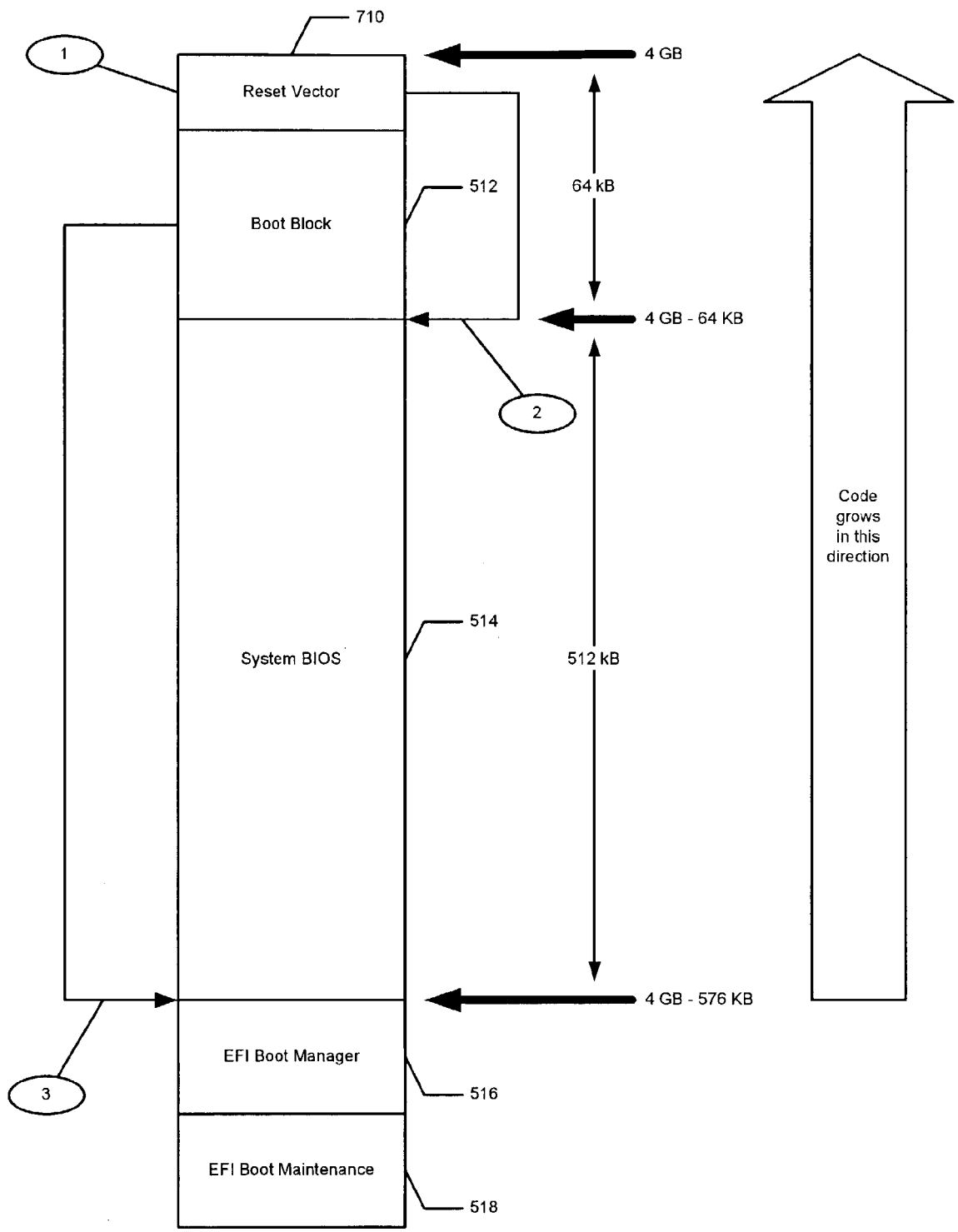
FIG. 7 is a block diagram representation of example BIOS components stored in a primary partition of the flash memory.

To illustrate the concept of boundaries associated with non-shared BIOS components, the processor 120 uses the left partition 410 to boot the processor system 100 by executing a reset vector 710 within the boot block 512 and jumping to an address of 4 GB-64 kB to execute codes associated with the boot block 512 because codes and/or data stored within the flash memory 134 grow from bottom up as shown in FIG. 7. Accordingly, the boundaries of the boot block 512 begin at an address of 4 GB-64 kB and end at an address of 4 GB because the boot block 512 occupies 64 kB of memory space within the flash memory 134. After executing the codes associated with the boot block 512, the processor 120 proceeds to the next BIOS component (i.e., the system BIOS 514). In particular, the processor 120 jumps to an address of 4 GB-576 kB to execute codes associated with the system BIOS 514, which occupies 512 kB of memory space within the flash memory 134. Because codes and/or data stored within the flash memory 134 grow from bottom up as noted above, the boundaries of the system BIOS 514 begin at an address of 4 GB-576 kB and end at an address of 4 GB-64 kB (i.e., 4 GB-576 kB-512 kB equals 4 GB-64 kB).

As noted above, the mid-point 503 of the flash memory 134 begins at the address of 4 GB-2 MB. Because the secondary boot block 532 occupies 64 kB of memory space in the flash memory 134, the boundaries of the secondary boot block 532 begin at an address of 4 GB-2 MB-64 kB and end at an address of 4 GB-2 MB (i.e., the mid-point 503 of the flash memory 134) if the processor 120 uses the left partition 410 to boot the processor system 120. As another example, the secondary system BIOS 534 occupies 512 kB of the flash memory 134. Accordingly, the boundaries of the secondary system BIOS 534 begin at an address of 4 GB-2 MB-576 kB and end at the address of 4 GB-2 MB-64 kB (i.e., where the secondary boot block 532 begins).

Alternatively, the processor 120 may use the right partition 420 to boot the processor system 120 such that the left partition 410 and the right partition 420 reverse roles with the right partition 420 acting as the primary partition and the left partition 410 acting as the secondary partition. In this case, the boundaries of the boot block 512 begin at the address of 4 GB-2 MB-64 kB and end at the address of the 4 GB-2 MB (i.e., the midpoint 503 of the flash memory 134). The boundaries of the system BIOS 514 begin at the address of 4 GB-2 MB-576 kB and end at the address of 4 GB-2 MB-64 kB. The boundaries of the boot block 532 begin at the address of 4 GB-64 kB and end at the address of 4 GB. The boundaries of the system BIOS 534 begin at the address of 4 GB-576 kB and end at the address of 4 GB-64 kB.

While some of the BIOS components 310 may be updated as mentioned above, other BIOS components 310 may remain constant when the BIOS 220 is executed by the processor 120 to boot the processor system 100. That is, a BIOS component, such as the EFI NVRAM 522 and the EFI core 524, may be shared between partitions. Instead of maintaining start address and end address for shared BIOS components in the BIOS table, the relative position and partition identifier of each shared BIOS components are maintained in the BIOS table. To illustrate this concept, each of the shared BIOS components may be a part of the primary partition and/or the secondary partition regardless of whether the shared BIOS component is on the left partition 410 or the right partition 420. That is, the EFI NVRAM 522, the EFI 524, the system error log 542, the system defaults 544, the user logo 546, and the user binary 548 may in the primary partition or the secondary partition. For example, the processor 120 may use the left partition 410 (i.e., the primary partition) for BIOS boots of the processor system 100, and use the right partition 420 (i.e., the secondary partition) for BIOS updates from the OS 240. A flag may be set by the OS 240 to indicate whether the secondary partition 420 is updated in a boot.

In a subsequent boot of the processor system 100, the processor 120 determines if there was a BIOS update in the previous boot of the processor system 100 based on the flag updated by the OS 240 when the processor 120 initiates from the left partition 410 for the subsequent boot. If an update was made to the BIOS components stored in the right partition 420, the processor 120 switches to the BIOS components stored in the right partition 420 to boot the processor system 100. As a result, the processor system 100 is reset and the non-shared BIOS components stored in the left partition 410 become the secondary partition while the non-shared BIOS components stored in the right partition 420 become the primary partition. In contrast, the shared BIOS components remain the same and operate without any changes regardless of whether the left partition 410 is the primary partition and the right partition 420 is the secondary partition or vice versa.

The boundaries of shared BIOS components (e.g., the EFI NVRAM 522, the EFI core 524, the system error log 542, the system default 544, the user log 546, and/or the user binary 548) are arbitrarily chosen to allow growth of non-shared BIOS components (e.g., the primary boot block 512, the secondary boot block 532, the primary system BIOS 514, and/or the secondary system BIOS 534) within the flash memory 134. For example, the begin offset of shared BIOS components may be 1024 kB on either the left partition 410 or the right partition 420. Both the EFI NVRAM 524 and the system error log 544 have begin offsets of 1024 kB. Because each of the EFI NVRAM 524 and the system error log 544 consumes 128 kB of memory space, both the EFI NVRAM 524 and the system error log 544 have end offsets of 1152 kB (i.e., 1024 kB+128 kB). If the processor 120 boots the processor system 100 using the non-shared BIOS components stored in the left partition 510, the boundaries of the EFI NVRAM 524 begin at an address of 4 GB-1024 kB and end at an address of 4 GB-1152 kB whereas the boundaries of the system error log 544 begin at an address of 4 GB-2 MB-1024 kB and end at an address of 4 GB-2 MB-1152 kB. Alternatively, if the processor 120 boots the processor system 100 using the non-shared BIOS components stored in the right partition 520, the boundaries of the EFI NVRAM 524 begin at the address of 4 GB-2 MB-1024 kB and end at the address of 4 GB-2 MB-1152 kB whereas the boundaries of the system error log 544 begin at the address of 4 GB-1024 kB and end at the address of 4 GB-1152 kB. Basically, the boundaries of the EFI NVRAM 524 and the system error log 544 are reversed depending on whether the processor 120 boots from the BIOS components 310 stored in the left partition 510 or the right partition 520.

Figure 8:
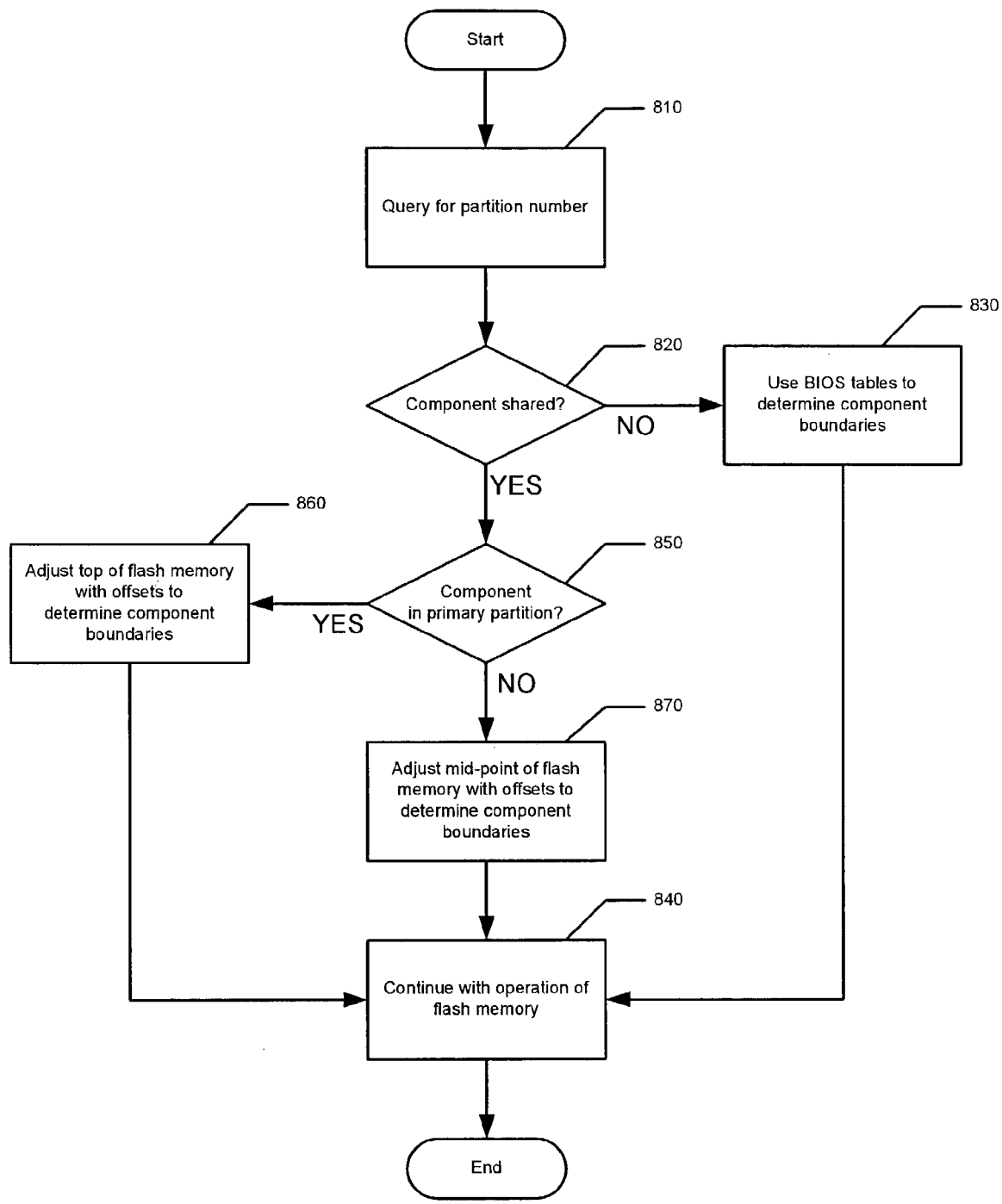
FIG. 8 is a flow diagram representation of example machine readable instructions that may update a BIOS.

Machine readable instructions that may be executed by the processor system 100 (e.g., via the processor 120) are illustrated in FIG. 8. Persons of ordinary skill in the art will appreciate that the instructions can be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. Further, although a particular order of steps is illustrated in FIG. 8, persons of ordinary skill in the art will appreciate that these steps can be performed in other temporal sequences. Again, the flow chart 800 is merely provided as an example of one way to program the processor system 100 to update the BIOS 220.

The processor system 100 is booted up by the BIOS 220 (via the processor 120) with the BIOS components 310 stored in the primary partition of the flash memory 134 (i.e., the left partition 410). In the example of FIG. 8, the illustrated process 800 may begin with the processor system 100 entering into a pre-boot environment. The pre-boot environment is an environment in which an intended operating system (OS), such as Microsoft Windows® is not yet running. In the pre-boot environment, drivers may be loaded that enable a user to obtain and change settings for particular devices. Entering the pre-boot environment may be initiated by, for example, applying power to the processor system 100. As is known to those having ordinary skill in the art, upon receiving power, the processor 120 experiences a reset condition that causes the processor 120 to execute instructions located in a boot block of the non-volatile memory 134 (e.g., a flash memory) via a reset vector in the processor 120. The instructions in the boot block 312 impart functionality to the processor 120 and inform the processor 120 of the location of further firmware instructions (e.g., the BIOS components 310) to be executed by the processor 120. The firmware instructions executed by the processor 120 may be stored in the non-volatile memory 134 (e.g., a flash memory), the mass storage device 180 (e.g., a hard drive), and/or any other memory device. Alternatively, the illustrated process 800 may be executed in a post-boot environment (i.e., a runtime environment provided after the OS 210 is operating).

To update the BIOS 220, the processor 120 queries for a partition identifier associated with a BIOS component (block 810). The process of FIG. 8 may be repeated for all BIOS components 310. Based on the partition identifier, the processor 120 determines whether the BIOS component is a shared component (block 820). The BIOS component may be pre-defined as either a shared component or a non-shared component. Referring to FIGS. 5 and 6, for example, the EFI NVRAM block 522 and the system error log block 542 may be shared components whereas the primary boot block 512, the primary system BIOS block 514, the secondary boot block 532, and the secondary system BIOS block 534 are non-shared components.

Returning to FIG. 8, if the BIOS component is a non-shared component then the BIOS 220 determines the boundaries of that BIOS component based on the BIOS table 600 (block 830). For example, the BIOS table 600 indicates that the boundaries of the system BIOS block 514 begin at the address of 4 GB-576 kB and end at the address of 4 GB-64 kB. In another example, the BIOS table 600 indicates that the boundaries of EFI boot maintenance block 518 begin at the address of 4 GB-640 kB and end at the address of 4 GB-608 kB. After determining the boundaries of the BIOS component at block 830, the processor 120 continues with operations of the flash memory 134 such as read and/or writes to the flash memory 134 (block 840).

Alternatively, the processor 120 determines that the BIOS component is a shared component at block 820. The processor 120 then determines whether the shared BIOS component is in the primary partition of the flash memory 134 (block 850). To illustrate this concept, the left partition 410 shown in FIG. 5 is designated as the primary partition used boot up the processor system 100, and the right partition 420 is designated as the secondary partition used as the backup. If the shared BIOS component is in the left partition 410 (i.e., the primary partition), the processor 120 determines the boundaries of the shared BIOS component (block 860) based on the top 302 of the flash memory 134. In particular, the processor 120 subtracts an offset associated with the shared BIOS component from the top 302 of the flash memory 134 to determine the boundaries of the shared BIOS component. For example, the EFI NVRAM block 522 has a begin offset of 1024 kB, which is arbitrarily chosen to allow growth of the non-shared components. Because the EFI NVRAM block 522 occupies 128 kB of memory space in the flash memory 134, the EFI NVRAM block 522 has an end offset of 1152 kB. Accordingly, the boundaries of the EFI NVRAM block 522 begin at an address of 4 GB-1024 kB and end at an address of 4 GB-1152 kB (i.e., 4 GB-1024 kB-128 kB). In another example, the EFI core block 524 has a begin offset 1152 kB and an end offset of 1920 kb because the EFI core block 524 occupies 768 kB of memory space in the flash memory 134. The boundaries of the EFI core block 524 begin at an address of 4 GB-1152 kB and end at an address of 4 GB-1920 kB. After determining the boundaries of the shared BIOS component, the processor 120 continues with operations of the flash memory 134 (block 840).

If processor 120 at block 850 determines that the shared BIOS component is not in the primary partition (i.e., the shared BIOS component is in the right partition 420), the processor 120 determines the boundaries of the shared BIOS component based on the mid-point of the flash memory 134 (block 870). In particular, the processor 120 subtracts an offset associated with the shared BIOS component from the mid-point of the flash memory 134. To illustrate this concept, assume the size of the flash memory 134 is 4 MB such that the mid-point 503 of the flash memory is 4 GB-2 MB (i.e., 2 MB is half of 4 MB). For example, the system error log block 542 has a begin offset of 1024 kB (arbitrarily chosen to allow growth of non-shared BIOS components) and an end offset of 1152 kB because the system error log block 542 occupies 128 kB of memory space in the flash memory 134. Accordingly, the boundaries of the system error log 524 begin at an address of 4 GB-2 MB-1024 kb and end at an address of 4 GB-2 MB-1152 kB. In another example, the user logo block 546 has a begin offset of 1216 kB with the arbitrary begin offset of the shared BIOS components added the size of the system error log block 542 and of the system defaults block 544 (i.e., 1024 kB+128 kB+40 kB). The user logo block 546 has an end offset of 1344 kB with the begin offset of the user logo block 546 added to the size of the user logo block 546 (i.e., 1024 kB+128 kB+40 kB+128 kB). As a result, the boundaries of the user logo block 546 begin at an address of 4 GB-2 MB-1216 kB and end at an address of 4 GB-2 MB-1344 kB. After determining the boundaries of the component at block 870, the processor 120 continues with operations of the flash memory 134 (block 840).

Alternatively, the processor 120 may determine the boundaries of a shared BIOS component in the left partition 410 based on the position of the mid-point 503 of the flash memory 134 if the left partition 410 is the primary partition. For example, the boundaries of the EFI core block 524 begin at an address of 4 GB-2 MB-1024 kB+2 MB and end at an address of 4 GB-2 MB-1920 kB+2 MB. The processor 120 may use the position of the bottom 304 of the flash memory 134 to determine the boundaries of a shared BIOS component in the right partition 420. For example, the boundaries of the user logo block 546 begin at an address of 4 GB-4 MB-1216 kB+4 MB and end at an address of 4 GB-4 MB-1344 kB+4 MB.

By partitioning and managing the flash memory 134 in the configurations as described herein, not all of the BIOS components 310 needs to be duplicated to update the BIOS 220. To avoid redundancy, shared BIOS components are not duplicated because such BIOS components are available between the partitions. As a result, memory space within the flash memory 134 is conserved.

The methods and apparatus disclosed herein are particularly well suited for use to update a BIOS. However, the teachings of the disclosure may be applied to update firmware without departing from the scope or spirit thereof.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to update a basic input/output system (BIOS) comprising:
   determining a storing characteristic associated with a BIOS component stored in a non-volatile memory;
   determining whether the BIOS component is a shared BIOS component or a non-shared BIOS component;
   determining boundaries of the BIOS component within the non-volatile memory based on the storing characteristic associated with the BIOS component and whether the BIOS component is a shared BIOS component or a non-shared BIOS component; and
   updating the BIOS component within the boundaries.

2. A method as defined in claim 1, wherein determining the storing characteristic associated with the BIOS component comprises querying for a partition identifier associated with a BIOS component stored in a flash memory.

3. A method as defined in claim 1, wherein determining the storing characteristic associated with the BIOS component comprises identifying one of a primary partition characteristic and a secondary partition characteristic associated with the BIOS component.

4. A method as defined in claim 1, wherein determining the storing characteristic associated with the BIOS component comprises determining the storing characteristic associated with one of a code area and a data area.

5. A method as defined in claim 1, wherein determining boundaries of the BIOS component within the non-volatile memory comprises adjusting one of a top portion, a mid-point portion, and a bottom portion of a flash memory with at least one offset.

6. A method as defined in claim 1, wherein determining boundaries of the BIOS component within the non-volatile memory comprises subtracting at least one offset from a top portion of a flash memory in response to detecting a primary partition identifier associated with the BIOS component.

7. A method as defined in claim 1, wherein determining boundaries of the BIOS component within the non-volatile memory comprises subtracting at least one offset from a mid-point portion of a flash memory in response to detecting a secondary partition identifier associated with the BIOS component.

8. A machine readable medium storing instructions, which when executed, cause a machine to:
   determine a storing characteristic associated with a BIOS component stored in a non-volatile memory;
   determine whether the BIOS component is a shared BIOS component or a non-shared BIOS component;
   determine boundaries of the BIOS component based on the storing characteristic associated with the BIOS component and whether the BIOS component is a shared BIOS component or a non-shared BIOS component; and
   update the BIOS component within the boundaries.

9. A machine readable medium as defined in claim 8, wherein the instructions cause the machine to determine the storing characteristic associated with the BIOS component by querying for a partition identifier associated with a BIOS component stored in a flash memory.

10. A machine readable medium as defined in claim 8, wherein the instructions cause the machine to determine the storing characteristic associated with the BIOS component by identifying one of a primary partition characteristic and a secondary partition characteristic associated with the BIOS component.

11. A machine readable medium as defined in claim 8, wherein the instructions cause the machine to determine the storing characteristic associated with the BIOS component by determining the storing characteristic associated with one of a code area and a data area.

12. A machine readable medium as defined in claim 8, wherein the instructions cause the machine to determine boundaries of the BIOS component within the non-volatile memory by adjusting one of a top portion, a mid-point portion, and a bottom portion of a flash memory with at least one offset.

13. A machine readable medium as defined in claim 8, wherein the instructions cause the machine to determine boundaries of the BIOS component within the non-volatile memory comprises subtracting at least one offset from a top portion of a flash memory in response to detecting a primary partition identifier associated with the BIOS component.

14. A machine readable medium as defined in claim 8, wherein the instructions cause the machine to determine boundaries of the BIOS component within the non-volatile memory by subtracting at least one offset from a mid-point portion of a flash memory in response to detecting a secondary partition identifier associated with the BIOS component.

15. A machine readable medium as defined in claim 8, wherein the machine readable medium comprises one of a programmable gate array, application specific integrated circuit, erasable programmable read only memory, read only memory, random access memory, magnetic media, and optical media.

16. A processor system comprising:
a data structure; and
a processor operatively coupled to the data structure, the processor being programmed to determine a storing characteristic associated with a BIOS component stored in the data structure, to determine whether the BIOS component is a shared BIOS component or a non-shared BIOS component, to determine boundaries of the BIOS component based on the storing characteristic and the operating characteristic associated with the BIOS component and whether the BIOS component is a shared BIOS component or a non-shared BIOS component, and update the BIOS component within the boundaries.

17. An apparatus as defined in claim 16, wherein the storing characteristic comprises one of a primary partition characteristic and a secondary partition characteristic.

18. An apparatus as defined in claim 16, wherein the BIOS component comprises one of a code area and a data area.

19. An apparatus as defined in claim 16, wherein the boundaries of the BIOS component comprise at least one offset adjusted from one of a top portion, a mid-point portion, and a bottom portion of a flash memory.

20. An apparatus as defined in claim 16, wherein the processor is programmed to subtract at least one offset from a top portion of a flash memory in response to detecting a primary partition characteristic associated with the BIOS component.

21. An apparatus as defined in claim 16, wherein the processor is programmed to subtract at least one offset from a mid-point portion of a flash memory in response to detecting a secondary partition characteristic associated with the BIOS component.

22. A processor system comprising:
a flash memory; and
a processor operatively coupled to the flash memory, the processor being programmed to determine a storing characteristic associated with a BIOS component stored in the flash memory, to determine whether the BIOS component is a shared BIOS component or a non-shared BIOS component, to determine boundaries of the BIOS component based on the storing characteristic associated with the BIOS component and whether the BIOS component is a shared BIOS component or a non-shared BIOS component, and update the BIOS component within the boundaries.

23. An apparatus as defined in claim 22, wherein the storing characteristic comprises one of a primary partition characteristic and a secondary partition characteristic.

24. An apparatus as defined in claim 22, wherein the BIOS component comprises one of a code area and a data area.

25. An apparatus as defined in claim 22, wherein the boundaries of the BIOS component comprise at least one offset adjusted from one of a top portion, a mid-point portion, and a bottom portion of a flash memory.

26. An apparatus as defined in claim 22, wherein the processor is programmed to subtract at least one offset to a top portion of a flash memory in response to detecting a primary partition characteristic associated with the BIOS component.

27. An apparatus as defined in claim 22, wherein the processor is programmed to subtract at least one offset to a mid-point portion of a flash memory in response to detecting a secondary partition characteristic associated with the BIOS component.

* * * * *